(12) United States Patent
Lee et al.

(10) Patent No.: US 7,164,524 B2
(45) Date of Patent: Jan. 16, 2007

(54) OPTICAL MICROELECTROMECHANICAL DEVICE AND FABRICATION METHOD THEREOF

(75) Inventors: Chia-Sheng Lee, Taichung (TW); Han-Tu Lin, Wuci Township, Taichung County (TW); Jia-Fam Wong, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/135,900

(22) Filed: May 24, 2005

(65) Prior Publication Data

US 2006/0146391 A1 Jul. 6, 2006

(30) Foreign Application Priority Data

Dec. 30, 2004 (TW) .............................. 93141353 A

(51) Int. Cl.
*G02B 26/00* (2006.01)
*G02B 26/08* (2006.01)

(52) U.S. Cl. ...................... 359/291; 359/290; 359/298; 359/224; 438/29; 438/72; 353/99; 427/162

(58) Field of Classification Search ........ 359/290–295, 359/298, 201, 224, 230, 231, 850, 245, 247, 359/321; 438/29, 57, 72, 73, 772; 430/311, 430/313–318, 322, 394; 427/162, 163.1, 427/259; 353/99; 345/84, 85; 347/239; 216/58; 156/345.33
See application file for complete search history.

(56) References Cited

U.S. PATENT DOCUMENTS

| | | | | |
|---|---|---|---|---|
| 5,453,778 A | * | 9/1995 | Venkateswar et al. | 347/239 |
| 6,014,240 A | * | 1/2000 | Floyd et al. | 359/201 |
| 6,025,951 A | * | 2/2000 | Swart et al. | 359/245 |
| 6,028,689 A | * | 2/2000 | Michalicek et al. | 359/224 |
| 6,034,810 A | * | 3/2000 | Robinson et al. | 359/293 |
| 6,040,937 A | * | 3/2000 | Miles | 359/291 |
| 6,055,090 A | * | 4/2000 | Miles | 359/291 |
| 6,123,985 A | * | 9/2000 | Robinson et al. | 427/162 |
| 6,323,982 B1 | * | 11/2001 | Hornbeck | 359/224 |
| 6,574,033 B1 | | 6/2003 | Chui et al. | 359/291 |
| 6,674,562 B1 | | 1/2004 | Miles | 359/291 |
| 6,794,119 B1 | | 9/2004 | Miles | 430/313 |
| 6,962,419 B1 | * | 11/2005 | Huibers | 353/99 |
| 7,023,606 B1 | * | 4/2006 | Huibers | 359/290 |
| 7,046,420 B1 | * | 5/2006 | Hunter et al. | 359/291 |
| 2002/0015215 A1 | | 2/2002 | Miles | 359/290 |
| 2002/0024711 A1 | | 2/2002 | Miles | 359/247 |
| 2002/0075555 A1 | | 6/2002 | Miles | 359/291 |
| 2002/0126364 A1 | | 9/2002 | Miles | 359/247 |
| 2003/0043157 A1 | | 3/2003 | Miles | 345/540 |
| 2003/0133284 A1 | | 7/2003 | Chipchase et al. | 362/31 |
| 2004/0051929 A1 | | 3/2004 | Sampsell et al. | |

FOREIGN PATENT DOCUMENTS

TW 504583 4/1988

* cited by examiner

*Primary Examiner*—Loha Ben
(74) *Attorney, Agent, or Firm*—Thomas, Kayden, Horstemeyer & Risley

(57) ABSTRACT

An optical microelectromechanical (MEMS) device includes a conductive layer, a dielectric layer, a reflective layer and a plurality of supporters between the dielectric layer and reflective layer. The supporters are tapers, or inversed tapers, having an acute angle, wherein a side surface of one of the supporters and the surface of the dielectric layer form the acute angle. Each supporter comprises a horizontal extending portion connecting to the reflective layer, such that the reflective layer is suspended from the dielectric layer by a predetermined gap.

24 Claims, 5 Drawing Sheets

OPTICAL MICROELECTROMECHANICAL DEVICE AND FABRICATION METHOD THEREOF

The application claims the benefit of Taiwan application Serial Mo. 93141353, filed Dec. 30, 2004, the subject matter of which is incorporated herein by reference.

BACKGROUND

The invention relates to an optical microelectromechanical device, and in particular to an optical MEMS device with improved supports.

U.S. Pat. Nos. 6,574,033, and 6,794,119 disclose optical microelectromechanical systems (optical MEMS) or micro-opto-electromechanical systems (MOEMS) devices comprising arrayed floating reflective members to modulate required images by interference.

FIG. 1A is a cross-section of a display unit of a conventional optical MEMS device 10. In FIG. 1A, the optical MEMS device 10 comprises a conductive layer 13 and a dielectric layer 14 on a glass substrate 12. A reflective layer 18 is supported by a plurality of supporters 16, suspended from the dielectric layer 14 by a predetermined gap $d_1$. The supporters 16 are formed of polymer materials with horizontal extending top portions 162 connecting the reflective layer 18 to improve adhesion therebetween and distribute partial stress when the reflective layer 18 deforms.

As shown in FIG. 1A, a specific wavelength $\lambda_1$, for example, is constructively enhanced by interference and reflected, with all other wavelengths destructively eliminated by interference when a light beam with multiple wavelengths $\lambda_1, \lambda_2, \ldots, \lambda_n$ impinges on the reflective layer 18 through the glass substrate 12. The wavelength of the constructive interference depends on the gap $d_1$ between the dielectric layer 14 and reflective layer 18. Furthermore, the reflective layer 18 deforms and descends, attaching to the surface of the dielectric layer 14 as shown in FIG. 1B, when an external actuating current is supplied to the conductive layer 13. Accordingly, the reflectivity of the optical MEMS device 10 is reduced, acting as a "dark" state. Thus, the conventional optical MEMS device 10 with arrayed display units is capable of displaying required images according to external control currents.

FIG. 2A is an enlarged cross-section of a supporter 16 in FIGS. 1A and 1B during fabrication before removing sacrificial layer 15. As shown in FIG. 2A, corresponding to FIGS. 1A and 1B, a plurality of openings 152 perpendicular to the dielectric layer 14 are first defined on the sacrificial layer 15 and filled with fillers, for example, polymers, to form supporters 16 with top portions 162 capable of sustaining bending stress. The thickness, of the top portion 162, and predetermined gap $d_1$, between the dielectric layer 14 and the reflective layer 18, would deteriorate the deforming response time of the reflective layer 18. Because of the opening 152 and restrictions of fabricating processes, the center of the top portion 162, however, sinks seriously when the thickness of the top portion 162 is less than a specific thickness. Simultaneously, the thickness g, the connection between the top portion 162 and post, is reduced, such that the top portion 162 of each supporter 16 may break, reducing reliability of the conventional optical MEMS devices.

SUMMARY

Accordingly, an embodiment of the invention is to enhance the mechanical strength of conventional optical MEMS devices without deteriorating response time while increasing reliability thereof.

Accordingly, an embodiment of the invention provides an optical MEMS device comprising a conductive layer, a dielectric layer, a reflective layer and a plurality of supporters between the dielectric and reflective layers. The supporters are tapers, or inversed tapers, with an acute angle, wherein a side surface of one of the supporters and the surface of the dielectric layer form the acute angle. Each supporter comprises a horizontal extending portion contacting with the reflective layer, such that the reflective layer is supported and suspended over the dielectric layer by a predetermined gap.

The conductive and dielectric layers are transparent. The conductive layer is Indium Tin Oxide (ITO) or Chromium (Cr). The dielectric layer comprises SiOx or SiNx. The supporters are residual photoresists. The supporters are tapers with an acute angle, wherein a side surface of one of the supporters and the surface of the dielectric layer form the acute angle, ranging about 15° to 70°, with about 45° preferred. Each supporter comprises a horizontal top portion at the end contacting with the reflective layer, with the top portion thereof is in mushroom shape at a thickness between about 300 Å and 1500 Å. Additionally, the reflective layer comprises Ag, Al, Rb(Al)x, Ni, or Cr. The predetermined gap between the reflective and the dielectric layers is between about 1000 Å and 8000 Å.

An embodiment of the invention provides a method for fabricating an optical MEMS device. First, a conductive layer, a dielectric layer, and a sacrificial layer are sequentially formed on a substrate. Next, a plurality of openings is defined on the sacrificial layer, exposing the dielectric layer, wherein a side surface of one of the supports and the surface of the dielectric layer form an acute angle. Inserting fillers in the openings form a plurality of supporters therein. Next, forming a reflective layer on the sacrificial layer and over the fillers, cover the sacrificial layer and the supporters. Finally, removing the sacrificial layer, such that the reflective layer is supported by the supporters, wherein the reflective layer and the dielectric layer are separated by the supporters.

The conductive and dielectric layers may be transparent. The conductive layer is Indium Tin Oxide (ITO) or Chromium (Cr). The dielectric layer comprises SiOx or SiNx. The supporters are photoresists. The supporters are tapers with an acute angle, wherein a side surface of one of the supports and the surface of the dielectric layer form the acute angle ranging from about 15° to 70°, with about 45° preferred. Each supporter comprises a horizontal top portion at the end connecting to the reflective layer, with the top portion thereof is in mushroom shape at a thickness between about 300 Å and 1500 Å. Additionally, the reflective layer comprises Ag, Al, Rb(Al)x, Ni, or Cr. The predetermined gap between the reflective and the dielectric layers is between about 1000 Å and 8000 Å.

A further embodiment of the invention provides an optical MEMS device comprising a dielectric layer, a reflective layer and a plurality of supporters between the dielectric and reflective layers. The supporters are tapers and having an acute angle, wherein a side surface of one of the supports and the surface of the dielectric layer form the acute angle, between about 15° and 70°, with about 45° preferred.

Moreover, the dielectric layer comprises SiOx or SiNx. The supporters are tapers and photoresis. Each supporter comprises a horizontal top portion at the end connecting to the reflective layer, with the top portion thereof in mushroom shape at a thickness between about 300 Å and 1500 Å. Additionally, the reflective layer comprises Ag, Al, Rb(Al)x, Ni, or Cr. The predetermined gap between the reflective and the dielectric layers is between about 1000 Å and 8000 Å.

DESCRIPTION OF THE DRAWINGS

The invention can be more fully understood by reading the subsequent detailed description in conjunction with the examples and references made to the accompanying drawings, wherein.

DETAILED DESCRIPTION

Figure 3:
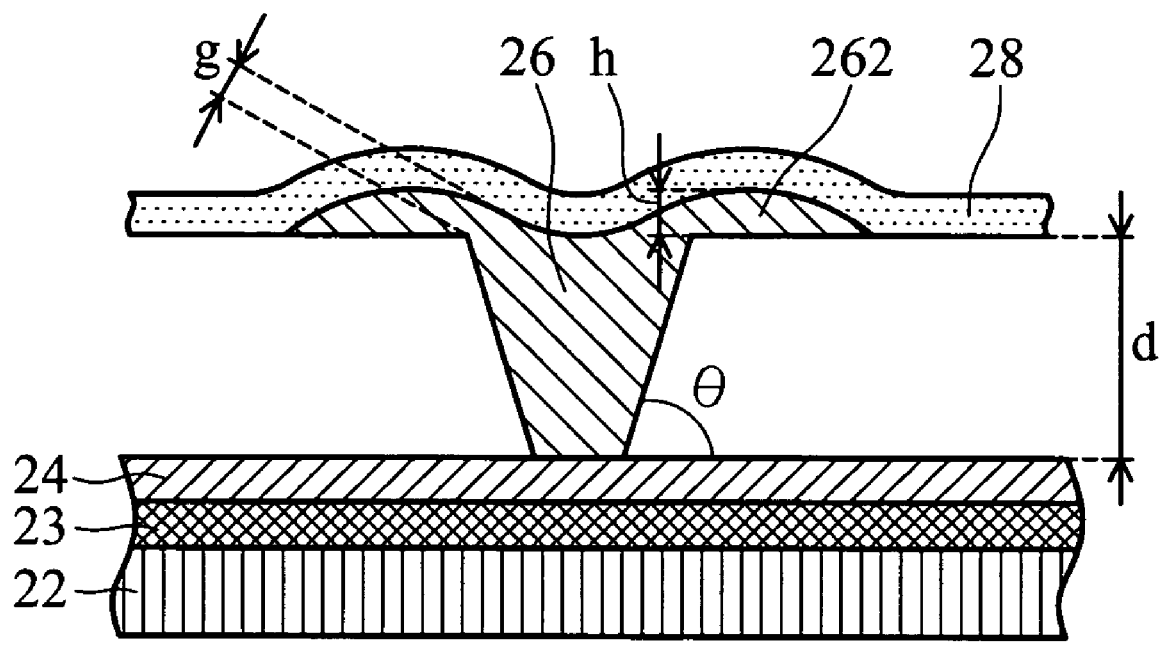
FIG. 3 is an enlarged cross-section of a supporter of an optical MEMS device in an embodiment of the invention before removal of the sacrificial layer.

FIG. 3 is partial cross-section of a supporter 26 of an optical MEMS device 20 in an embodiment of the invention after removal of the sacrificial layer 25. The optical MEMS device 20 comprises a conductive layer 23 and a dielectric layer 24 formed on a glass substrate 22. A reflective layer 28 supported by a plurality of supporters 26 (only one shown in FIG. 3), suspends from the dielectric layer 24 by a predetermined gap d.

In FIG. 3, the supporter 26 is a taper, or an inversed taper, with the profile at an end connecting to or contacting with the reflective layer 28, wherein the contacting portion between the supporter 26 and the reflective layer 28 is larger than that between the supporter 26 and the dielectric layer 24, such that a side surface of one of the supporters 26 and the surface of the dielectric layer 24 from an acute angle θ. The supporter 26 comprises a horizontal top portion 262 at the end connecting to the reflective layer 28 to improve adhesion therebetween and share partial stress when the reflective layer 28 deforms.

Figure 1A:
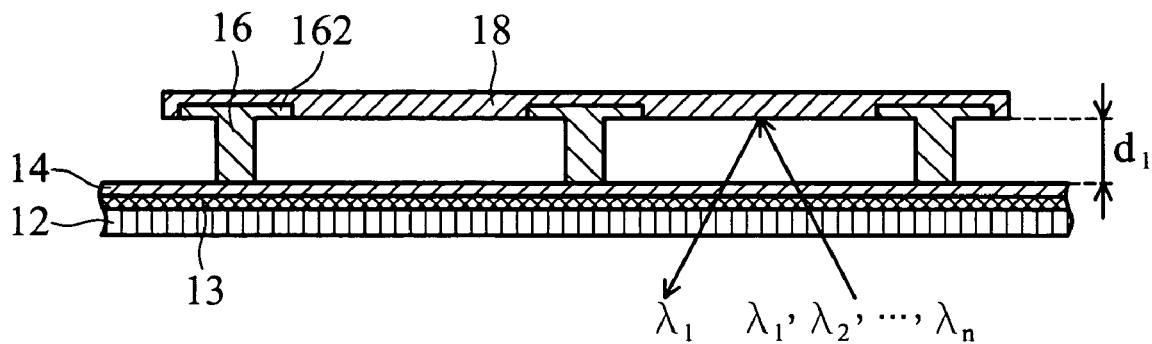
FIGS. 1A and 1B are cross-sections of a conventional optical MEMS device.
Figure 1B:
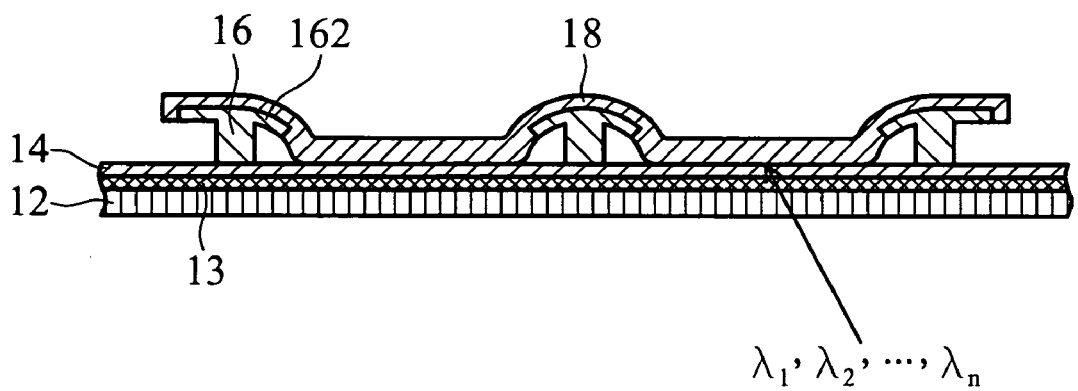
Figure 2A:
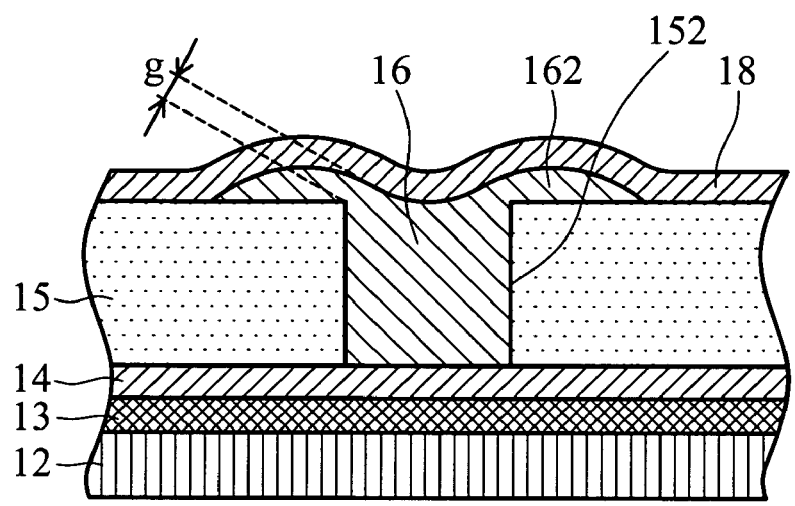
FIGS. 2A and 2B are enlarged cross-sections of a supporter of a conventional optical MEMS device before removal of the sacrificial layer.
Figure 2B:
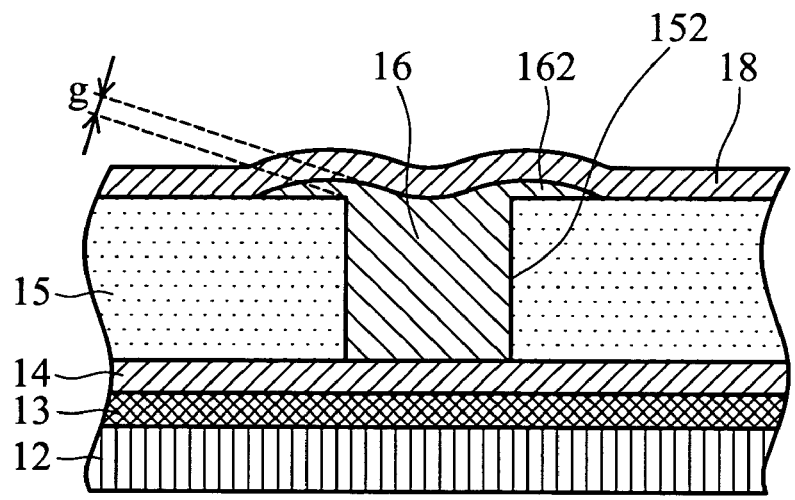

In order to increase the thickness g of the connection between the top portion 262 and post of the supporter 26 and enhance the mechanical strength thereof, the acute angle θ is between about 15° and 70°, with about 45° preferred. The top portion 262 is in mushroom shape. The thickness of the top portion 262 is between about 300 Å and 1500 Å. Because the profile at the connection of the top portion 262 and the post of the supporter 26 is smoother, the thickness g of the connection is improves on that of the conventional supporter 16 in FIG. 2B. Thus, mechanical strength of the top portion 262 is enhanced without deteriorating response time of the reflective layer 28, with enhanced reliability of the optical MEMS device 20.

Figure 4A:
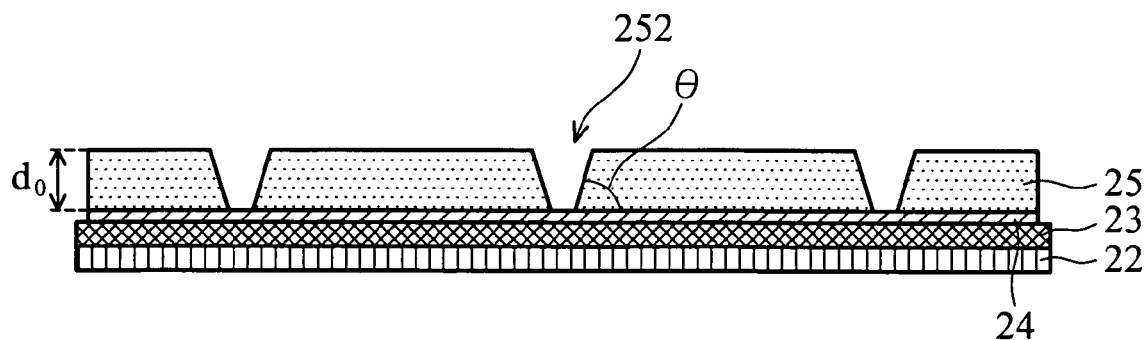
FIGS. 4A–4C are fabrication method for an optical MEMS device in an embodiment of the invention.
Figure 4B:
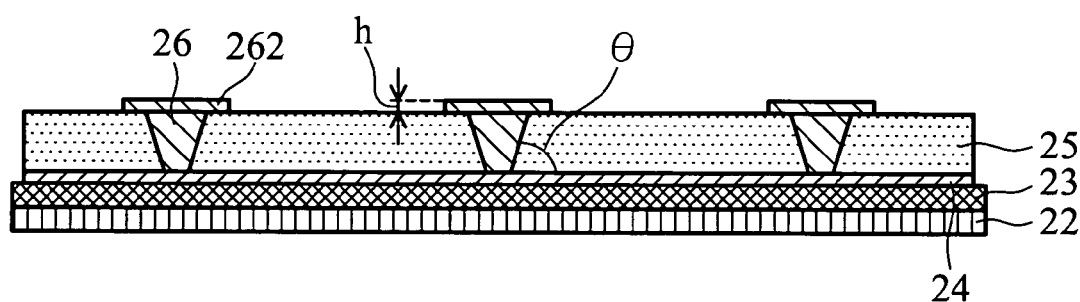
Figure 4C:
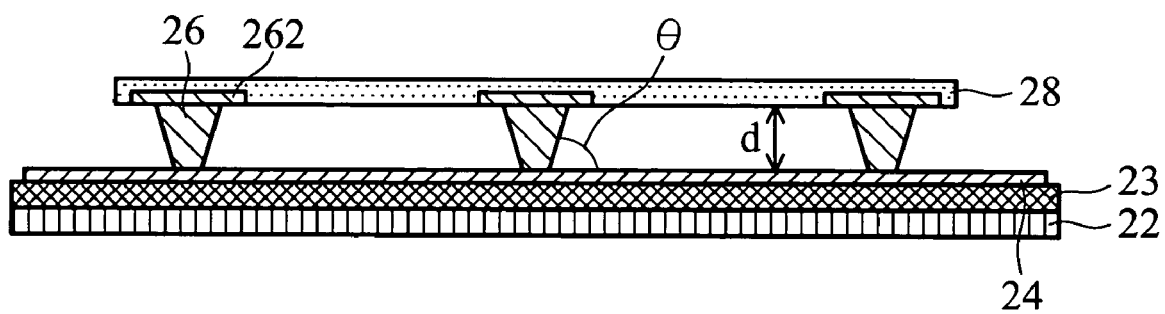

FIGS. 4A–4C are fabrication method for an optical MEMS device 20 in an embodiment of the invention. In FIG. 4A, a transparent conductive layer 23, for example, made of Indium Tin Oxide (ITO) or Chromium (Cr), is first deposited on a glass substrate 22, and defined into several control wires of the optical MEMS device 20 by etching or other semiconductor processes. Next, a dielectric layer 24 and a sacrificial layer 25 are sequentially formed on the conductive layer 23. The sacrificial layer 25 is, for example, molybdenum, tantalum, germanium, or silicon, formed by chemical vapor deposition (CVD). The thickness d of the sacrificial layer 25 is between about 1000 Å and 8000 Å, determined by the selected reflecting wavelength. A plurality of openings 252 are then defined on the sacrificial layer 25, exposing the dielectric layer 24, wherein a side surface of each opening 252 and the surface of the dielectric layer 24 form an acute angle θ. The acute angle θ is between about 15° and 70°, with about 45° preferred.

Next, inserting fillers in the openings 252 overlay portions of the sacrificial layer 25. A plurality of supporters 26 with required horizontal top portions 262 are then defined as shown in FIG. 4B by lithography. After exposure and development, the supporters 26 are hardened by baking or UV exposure to ensure required mechanical strength. The supporters 26 are residual positive photoresists, negative photoresists, polymer materials, or other materials with high etching selectivity with respect to the material of the sacrificial layer 25. Furthermore, the thickness h of the top portion 262 is determined by the required response time and mechanical strength of the optical MEMS device 20, between about 300 Å and 1500 Å is preferred.

In FIG. 4C, after the hardening processes, a reflective layer 28 overlaid on the sacrificial layer 25 and the supporters 26 is defined with required patterns thereon by lithography. The reflective layer 28 is metal with high reflectivity and mechanical properties, such as Ag, Al, Rb(Al)x, Ni, or Cr. Finally, the sacrificial layer 25 in FIG. 4B is removed, for example, by XeFe$_2$ Dry etching, such that the reflective layer 28 can be supported by the supporters 26 and separated from the dielectric layer 24, completing the optical MEMS device 20 of the invention.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical microelectromechanical device, comprising:
a conductive layer;
a dielectric layer disposed on the conductive layer;
a reflective layer disposed over the dielectric layer by a predetermined gap; and
a plurality of supporters disposed between the dielectric layer and the reflective layer, wherein a side surface of one of the supporters and the surface of the dielectric layer form an acute angle.

2. The optical microelectromechanical device as claimed in claim 1, wherein the acute angle is between about 15° and 70°.

3. The optical microelectromechanical device as claimed in claim 2, wherein the acute angle is about 45°.

4. The optical microelectromechanical device as claimed in claim 1, wherein the conductive layer and the dielectric layer are made of transparent material.

5. The optical microelectromechanical device as claimed in claim 1, wherein the conductive layer comprises Indium Tin Oxide (ITO) or Chromium (Cr).

6. The optical microelectromechanical device as claimed in claim 1, wherein the dielectric layer comprises SiOx or SiNx.

7. The optical microelectromechanical device as claimed in claim 1, wherein the supporters comprise photoresists.

8. The optical microelectromechanical device as claimed in claim 1, wherein at least one of the supporters is formed as a taper.

9. The optical microelectromechanical device as claimed in claim 1, wherein at least one of the supports comprises a horizontal top portion contacting with the reflective layer.

10. The optical microelectromechanical device as claimed in claim 9, wherein the thickness of the top portion is between 300 Å and 1500 Å.

11. The optical microelectromechanical device as claimed in claim 9, wherein the top portion is in mushroom shape.

12. The optical microelectromechanical device as claimed in claim 11, wherein the thickness of the top portion is between 300 Å and 1500 Å.

13. The optical microelectromechanical device as claimed in claim 1, wherein the predetermined gap is between about 1000 Å and 8000 Å.

14. The microelectromechanical systems device as claimed in claim 1, wherein the reflective layer comprises Ag, Al, Rb(Al)x, Ni, or Cr.

15. A method for fabricating an optical microelectromechanical device, comprising:
    forming a conductive layer, a dielectric layer, and a sacrificial layer sequentially on a substrate;
    forming a plurality of openings through the sacrificial layer to expose the dielectric layer, wherein a side surface of one of the openings and the surface of the dielectric layer form an acute angle;
    inserting fillers into the openings to form a plurality of supporters therein;
    forming a reflective layer on the sacrificial layer and over the fillers; and
    removing the sacrificial layer, such that the reflective layer is supported by the supporters, and that the reflective layer and the dielectric layer are separated by the supporters.

16. The method as claimed in claim 15, wherein the acute angle is between about 15° and 70°.

17. The method as claimed in claim 15, wherein the acute angle is about 45°.

18. The method as claimed in claim 15, wherein the conductive layer comprises ITO or Cr.

19. The method as claimed in claim 15, wherein the dielectric layer comprises SiOx or SiNx.

20. The method as claimed in claim 15, wherein the fillers comprise photoresists.

21. The method as claimed in claim 15, further comprising hardening the supporters.

22. The method as claimed in claim 15, wherein the thickness of the sacrificial layer is between about 1000 Å and 8000 Å.

23. The method as claimed in claim 15, wherein the sacrificial layer comprises Mo, Ta, Si, or Ge.

24. The method as claimed in claim 15, wherein the reflective layer comprises Ag, Al, Rb(Al)x, Ni, or Cr.

* * * * *